US007853629B2

(12) United States Patent
Duncan et al.

(10) Patent No.: US 7,853,629 B2
(45) Date of Patent: Dec. 14, 2010

(54) DOCUMENT IMAGING AND MANAGEMENT SYSTEM FOR PAPERLESS WORKFLOW

(75) Inventors: John Duncan, Coral Gables, FL (US); Carl W. Williams, Coral Gables, FL (US); Ramon Caudet, South Miami, FL (US)

(73) Assignee: Executive Data Systems, Inc., Miami, FL (US)

( * ) Notice: Subject to any disclaimer, the term of this patent is extended or adjusted under 35 U.S.C. 154(b) by 165 days.

(21) Appl. No.: 11/277,197

(22) Filed: Mar. 22, 2006

(65) Prior Publication Data

US 2006/0218188 A1 Sep. 28, 2006
US 2009/0172019 A2 Jul. 2, 2009

Related U.S. Application Data

(60) Provisional application No. 60/664,446, filed on Mar. 23, 2005.

(51) Int. Cl.
*G06F 12/00* (2006.01)
*G06F 17/30* (2006.01)

(52) U.S. Cl. .................. 707/821; 707/822; 707/825; 358/403; 382/305; 714/47; 714/48

(58) Field of Classification Search .................. 707/1, 707/100; 715/530
See application file for complete search history.

(56) References Cited

U.S. PATENT DOCUMENTS

| 5,161,214 | A | * | 11/1992 | Addink et al. ............... 707/1 |
| 5,884,321 | A | * | 3/1999 | Meffert .................. 707/104.1 |
| 6,449,065 | B1 | * | 9/2002 | Luther et al. ............... 358/534 |
| 6,674,924 | B2 | * | 1/2004 | Wright et al. .............. 382/306 |
| 6,744,936 | B2 | | 6/2004 | Irons et al. ................. 382/306 |
| 6,799,717 | B2 | | 10/2004 | Harris ....................... 235/375 |
| 6,865,284 | B2 | | 3/2005 | Mahoney et al. .......... 382/112 |
| 7,146,367 | B2 | * | 12/2006 | Shutt ......................... 709/217 |
| 2002/0161746 | A1 | | 10/2002 | Murakami et al. ............ 707/1 |
| 2002/0194026 | A1 | | 12/2002 | Klein et al. ................... 705/2 |
| 2003/0002068 | A1 | | 1/2003 | Constantin et al. ........ 358/1.15 |
| 2003/0101199 | A1 | * | 5/2003 | Briggi ....................... 707/200 |
| 2003/0226885 | A1 | | 12/2003 | Harris ....................... 235/375 |
| 2004/0267593 | A1 | | 12/2004 | Sammons et al. ............. 705/9 |
| 2005/0022122 | A1 | * | 1/2005 | Barrus et al. ............... 715/530 |
| 2005/0162686 | A1 | | 7/2005 | Barrus ...................... 358/1.15 |
| 2005/0185225 | A1 | * | 8/2005 | Brawn et al. ............... 358/401 |
| 2006/0053097 | A1 | * | 3/2006 | King et al. .................... 707/3 |
| 2006/0072144 | A1 | * | 4/2006 | Dowling et al. ........... 358/1.15 |
| 2006/0080278 | A1 | * | 4/2006 | Neiditsch et al. .............. 707/1 |
| 2007/0078853 | A1 | * | 4/2007 | Shutt ............................. 707/8 |

OTHER PUBLICATIONS

International search Report, Oct. 10, 2007, 6 pages.

* cited by examiner

*Primary Examiner*—Kuen S Lu
*Assistant Examiner*—Loan T Nguyen
(74) *Attorney, Agent, or Firm*—St. Onge Steward Johnston & Reens LLC

(57) ABSTRACT

A document imaging and management system, including a device for imaging at least one document having at least one computer-readable identifier, a database including a plurality of rules for managing documents and tasks, a processor, software executing on the processor for reading the computer-readable identifier, software executing on the processor for routing the imaged document based on the identifier, and software executing on the processor for determining a task associated with the document based on the identifier and at least one of the plurality of rules.

29 Claims, 13 Drawing Sheets

DOCUMENT IMAGING AND MANAGEMENT SYSTEM FOR PAPERLESS WORKFLOW

CROSS-REFERENCE TO RELATED APPLICATIONS

This application claims priority benefits under 35 § U.S.C. 119(e) of the U.S. Provisional Application No. 60/664,446, filed Mar. 23, 2005.

FIELD OF THE INVENTION

The present invention relates generally to a document management system, and more specifically to a system for the imaging, routing and management of documents and workflow.

BACKGROUND OF THE INVENTION

Since the advent of computers, there has been progress towards creating a digital or paperless office environment. Digitally created documents may be efficiently stored and tracked in a document management system. However paper documents present unique difficulties. For example, paper documents originating from sources external to the office or organization are difficult to efficiently integrate into the digital environment.

In an effort to integrate paper documents into the digital environment, technology has been developed to image or scan paper documents. For example, digital copiers, multi-function devices, and network scanners offer the potential to image hardcopy documents.

Some of such devices have the capability of recognizing text within a document. For example, optical character recognition ("OCR") software allows for the text of a document to be interpreted and digitally reproduced. However, OCR technology is prone to errors due in part to the difficulty of interpreting different fonts and imperfections in the scanned document.

Other devices are capable of recognizing indicia placed upon a document to better enable bulk scanning of documents. For example, a barcode affixed to a document by a user may be recognized and provide limited instructions to the device, such as an indication of the beginning of the document, the manner in which to orient the document for scanning, or the physical location of the paper document.

However, known systems lack the ability to identify the document or associate the document with an existing matter or transaction profile. Known systems further lack the ability to automatically update a profile based on the contents of the document, notify users of the document's receipt, and/or request approval of the particular document or an associated task.

SUMMARY OF THE INVENTION

According, it is an object of the present invention to provide an automated document imaging and management system to enable a paperless office. It is an object for the system to include provision for the automatic profiling and storing of imaged documents in corresponding files in the document management system or a relational database. It is also an object to provide a system including provision for the automatic routing and distribution of documents.

It is also an object of the present invention to provide a system for automating workflow including provision to automatically initiate or create a workflow, generate due dates and reminders, merge forms and generate documents to notify or seek authorization from clients, and otherwise provide professional services. Further objects of the present invention include the provision of an automatic log of all workflow in matters, automatic billing to clients, and automatic printing to network devices.

These and other objectives are achieved by providing a document imaging and management system, including a device for imaging at least one document having at least one computer-readable identifier, a database including a plurality of rules for managing documents and tasks, a processor, software executing on the processor for reading the computer-readable identifier, software executing on the processor for routing the imaged document based on the identifier, and software executing on the processor for determining at least one task associated with the document based on the identifier and at least one of the plurality of rules.

In one aspect, the system further includes software executing on the processor for initiating the at least one task and generating at least one task document. In another aspect, the system further includes software executing on the processor for storing the at least one task document in a location based on the identifier. In yet another aspect, the system includes software executing on the processor for transmitting the at least one task document to an electronic filing system or at least one client.

Also provided is a method for imaging and managing documents, including the steps of imaging a document, the document including at least one computer-readable identifier, interpreting the identifier, routing the document to one or more clients based on the identifier, and determining at least one task associated with the document based on the identifier and at least one rule.

DETAILED DESCRIPTION OF THE INVENTION

Figure 1:
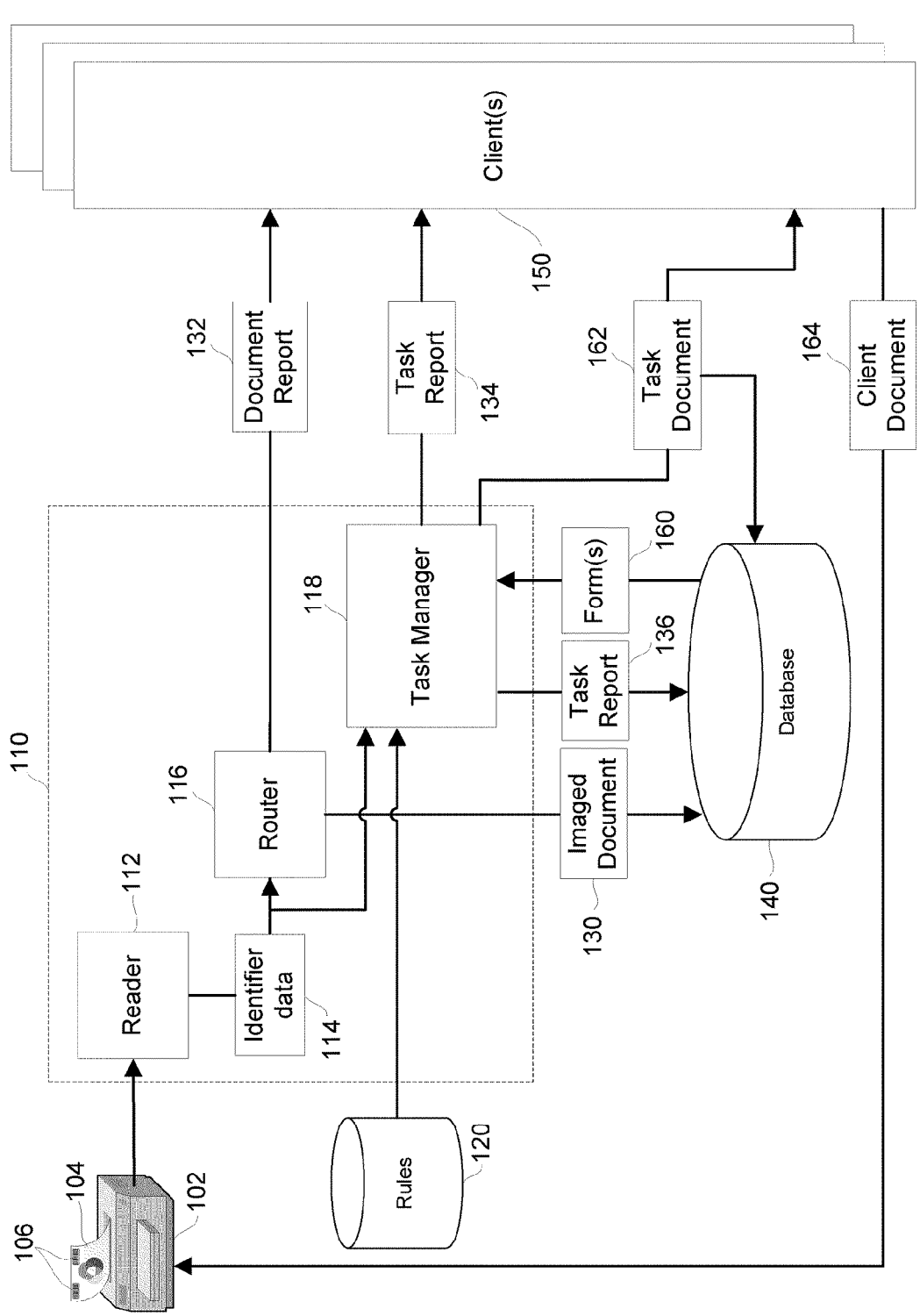
FIG. 1 is a schematic view of a document imaging and management system.

FIG. 1 shows an exemplary embodiment of a document imaging and management system according to the present invention. The system includes at least one imaging device 102. The imaging device 102 may be any device capable of imaging and/or scanning paper documents. The imaging device 102 may be, for example, a digital copier, network scanner, or a multifunction device having imaging capabilities. The imaging device 102 may receive and/or image documents, e.g., a document 104.

The system further includes one or more processors, e.g., processor 110. The processor 110 may be any device or system designed to receive and execute software programs, or which is designed to be modified in functionality by software programs, and preferably is from the group consisting of digital signal processors, microcontrollers, and microprocessors, or the group consisting of field programmable gate arrays, and computer programmable logic devices. The functionality associated with the processor 110 may be centralized or distributed, whether locally or remotely. In some embodiments, the processor 110 may be associated with a server (not shown).

The processor 110 may receive data indicative of an imaged document from the imaging device 102, e.g., via any wired or wireless connection, communication link, communication network, and/or file transfer protocol ("FTP"). For example, the imaging device 102 may image the document 104 having at least one computer-readable indicia or identifier 106 (e.g., barcode) thereon. In some embodiments, two or more identifiers 106 are used to provide different types of information or redundant information. The system further includes software 112 for reading the computer-readable identifier 106 and providing data 114 indicative of the identifier. In one embodiment, the identifier data 114 includes a task code and/or matter code. The software 112 may be executed on the processor 110 and/or any other processor. For example, the software 112 may be executed on a processor or controller of the imaging device 102.

The system further includes at least one storage or database. For example, the system includes at least one rules database 120. The rules database 120 includes a plurality of rules for managing documents and tasks. The rules database 120 may be centralized or distributed, whether locally or remotely. For example, the rules database 120 may include any number of databases, each being accessible by the system via a communications network (e.g., the Internet or intranet). The rules database 120 may include any number and/or types of rules. For example, in one embodiment, the system is employable by a law firm for the management of documents and workflow. Therefore, the rules database 120 may include intellectual property laws, rules, and procedures. The rules database 120 may further include federal or local rules of civil procedure. The rules database 120 may further include custom rules, e.g., pertaining to particular clients, matters, tasks, documents and/or types of matters, tasks or documents.

The system may receive any number of documents 104, via the imaging device 102 or electronically. The document 104 may be any document or type of document. For example, the document 104 may be an intellectual property document, such as a document related to the prosecution of a patent or trademark, or a litigation document such as a pleading. The document 104 may further be client correspondence or an invoice or payment (e.g., a check). Each document 104 includes at least one computer-readable identifier 106 or barcode. The computer-readable identifier 106 may be located on the document 104 or on a coversheet of the document 104. The computer-readable identifier 106 contains information about the document, such as a document key, and/or routing instructions or storage instructions for the document. The identifier 106 may also include information pertaining to any matters or tasks associated with the document. Upon reading the computer-readable identifier 104, the system according to the present invention may identify a transaction (e.g., sale of goods) or matter (e.g., legal or business matter) profile associated with the document 104 based on the computer-readable identifier 106. The system may further identify tasks associated with or indicated by the document 104 and/or route the document or a report thereof to any location or recipient.

As shown in FIG. 1, the system includes a storage location or database 140. The database 140 may be located in close proximity to the processor 110 or at any other location and in communication with the processor 110 via the communication network. In one embodiment, the rules database 120 and database 140 are portions or sub-databases of a single storage location or database. The database 140 may also include one or more matter storage locations and sub storage locations.

In a preferred embodiment, a document profile exists or is created for the document 104 (e.g., in the database 140) prior to imaging. The document profile 104 may include information about the document including routing and/or storage instructions for the document. The document may also be assigned a document key or code. If necessary, the system may then create a coversheet for the document 104 based on the information in the document profile. The coversheet includes one or more computer-readable identifiers 106 including information from the document profile, such as the document key. The document 104 is then imaged and the one or more identifiers 106 read by the software 112 and matched to its document profile (e.g., and/or task).

The system further includes software 116 executing on the processor for routing the document 104 or imaged document 130 based on the identifier 106. The routing software 116 may store the imaged document 130 (or any portion thereof) in a location of the database 140 indicated by the identifier 106. For example, the identifier 106 may provide information to determine the client, transaction, matter, matter profile, unique document profile and/or task associated with document 104. The imaged document 130 may then be stored in a location of the database 140 accordingly.

The routing software 116 may also route or electronically deliver a document report 132 to one or more clients 150 of the system. The client or clients 150 may be, for example, a user of the system such as one or more professionals in an office or organization. The client 150 may further be a customer of the organization for whom services are being performed. The client 150 may also be an institution, organization, or agency. The software 116 may identify recipients or clients 150 based on the identifier 106 and transmit the document report 132 (e.g., the imaged document or a notification of the document's receipt) to the client or clients 150. The client or clients 150 identified by the software may further be identified according to a rule of the rules database 120.

The system further includes software 118 executing on the processor 110 for determining at least one task associated with the document 104. The software 118 may determine the at least one task based on the identifier 106 and at least one of the plurality of rules, e.g., from the rules database 120. For example, in the case of a patent application matter, the software 118 may access patent rules or filing procedures from the rules database 120 (e.g., U.S. Patent Office database) and generate or update any number of tasks, deadlines, and/or a timeline for the patent application matter. The patent application matter may be a new matter, or an existing matter.

The software 118 may further report the task or tasks to one or more clients 150. For example, the software 118 may determine recipients of a task report 134 based on the identifier 106. The recipients or clients 150 may be, for example, persons or entities responsible for completing the tasks. The recipients or clients 150 may also be persons or entities for whom the tasks are being completed. The task report 134 may then be transmitted to the particular clients 150 by any electronic means, e.g., email or hyperlink.

The system further includes software (e.g., 118) executing on the processor for initiating a task. The software 118 may initiate a task by generating at least one task document 162. In some embodiments, the software 118 generates the task document 162 using one or more forms 160 (e.g., corresponding to the task). The form 160 may be received from a forms database, such as the database 140, the rules database 120, or any other storage location in communication with the system. The form 160 may then be populated according to particular task with information received from the rules database 120, the database 140 (e.g., in a matter profile or document profile), or a client 150. The task document 162 may then be stored in a location (e.g., in the database 140) based on or corresponding to the identifier 106. The task document 162 may also be transmitted or reported to one or more clients 150. The task document 162 may be provided to a client 150 as a draft, i.e., for completion or review, or as a completed document or work product. The client 150 may further transmit or send one or more client documents 164 to the system, such as a response to authorization. The client document 164 may be received, imaged (if necessary) and processed in accordance with the present invention.

Figure 2:
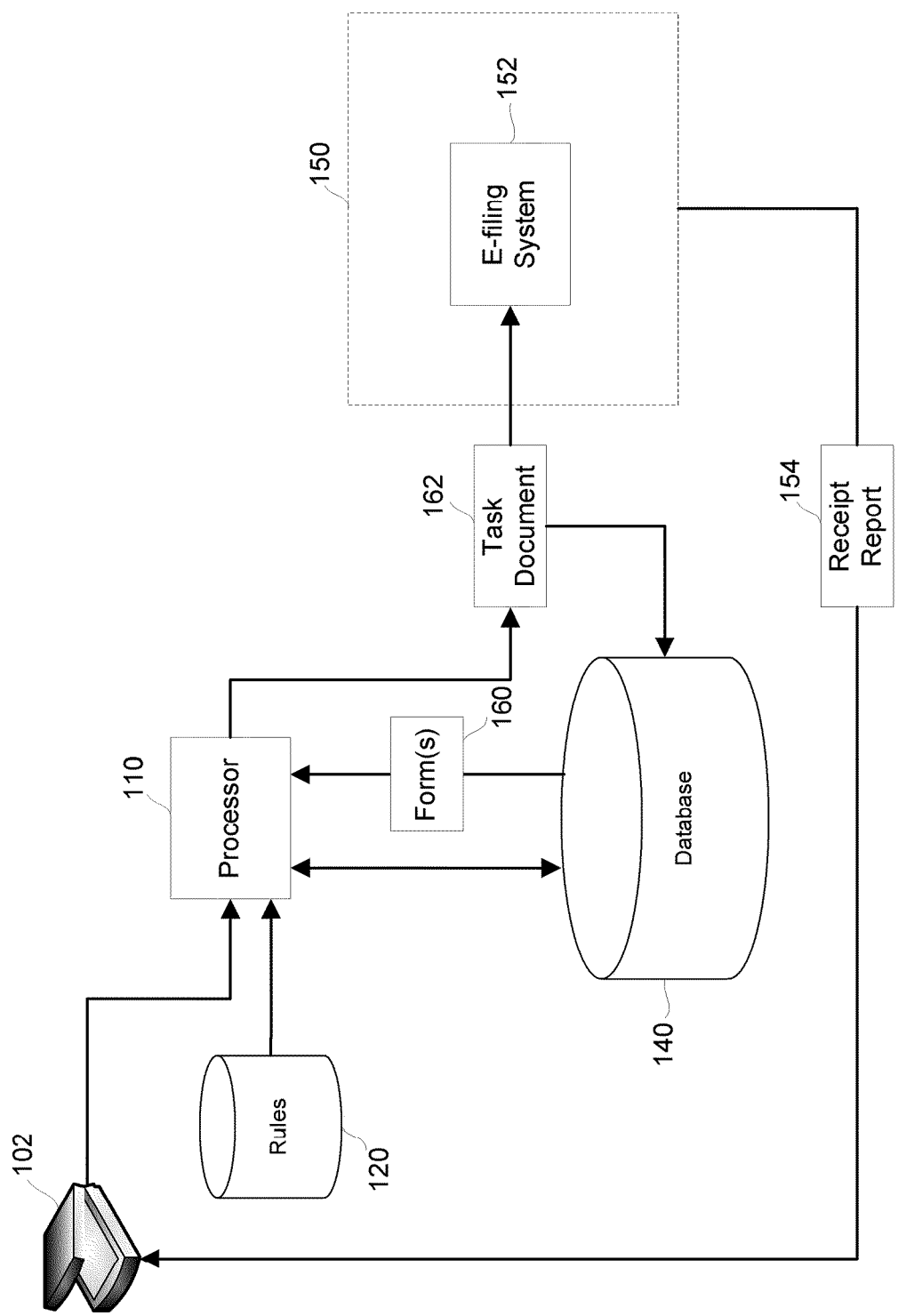
FIG. 2 is another schematic view of a document imaging and management system.

FIG. 2 shows another embodiment of the system according to the present invention. In the present embodiment, the client 150 may be an institution, entity, and/or agency. For example, the client 150 may be a court or government agency, such as the U.S. Patent and Trademark Office ("USPTO"). The client 150 in the present embodiment may include an electronic filing system 152 for electronically receiving and sending documents or correspondence. As shown, software executing on the processor 110 may therefore automatically transmit a task document 162 to the electronic filing system 152. The client 150 may also transmit documents or correspondence back to the system. For example, the client 150 may transmit a receipt report 154 (e.g., document) either by mail or electronically. The receipt report 154 may be then imaged and processed by the system in accordance with the present invention.

Figure 3:
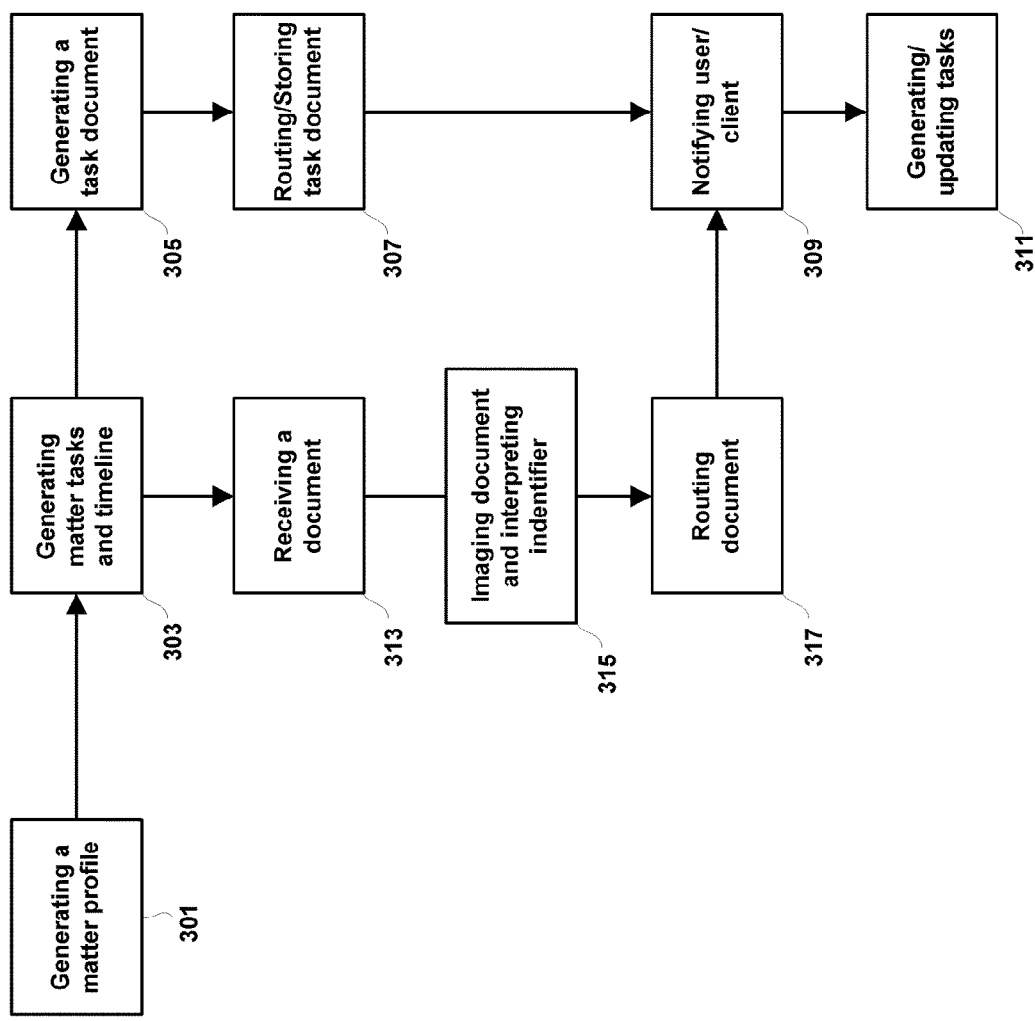
FIG. 3 is an exemplary flow chart illustrating the imaging and management of documents by the system shown in FIGS. 1 and 2.

FIG. 3 shows a flow chart illustrating one exemplary operation of the imaging and management of documents by the system of FIG. 1. As shown, the system (or user or client thereof) may generate a transaction or matter profile (step 301). For example, the system may be employed by a law firm (e.g., or any professional service provider). A matter profile may therefore be generated by an attorney or paralegal for a particular legal matter. Alternatively, the matter profile may be generated automatically, e.g., upon the receipt and imaging of a document identifying the new matter.

Figure 4:
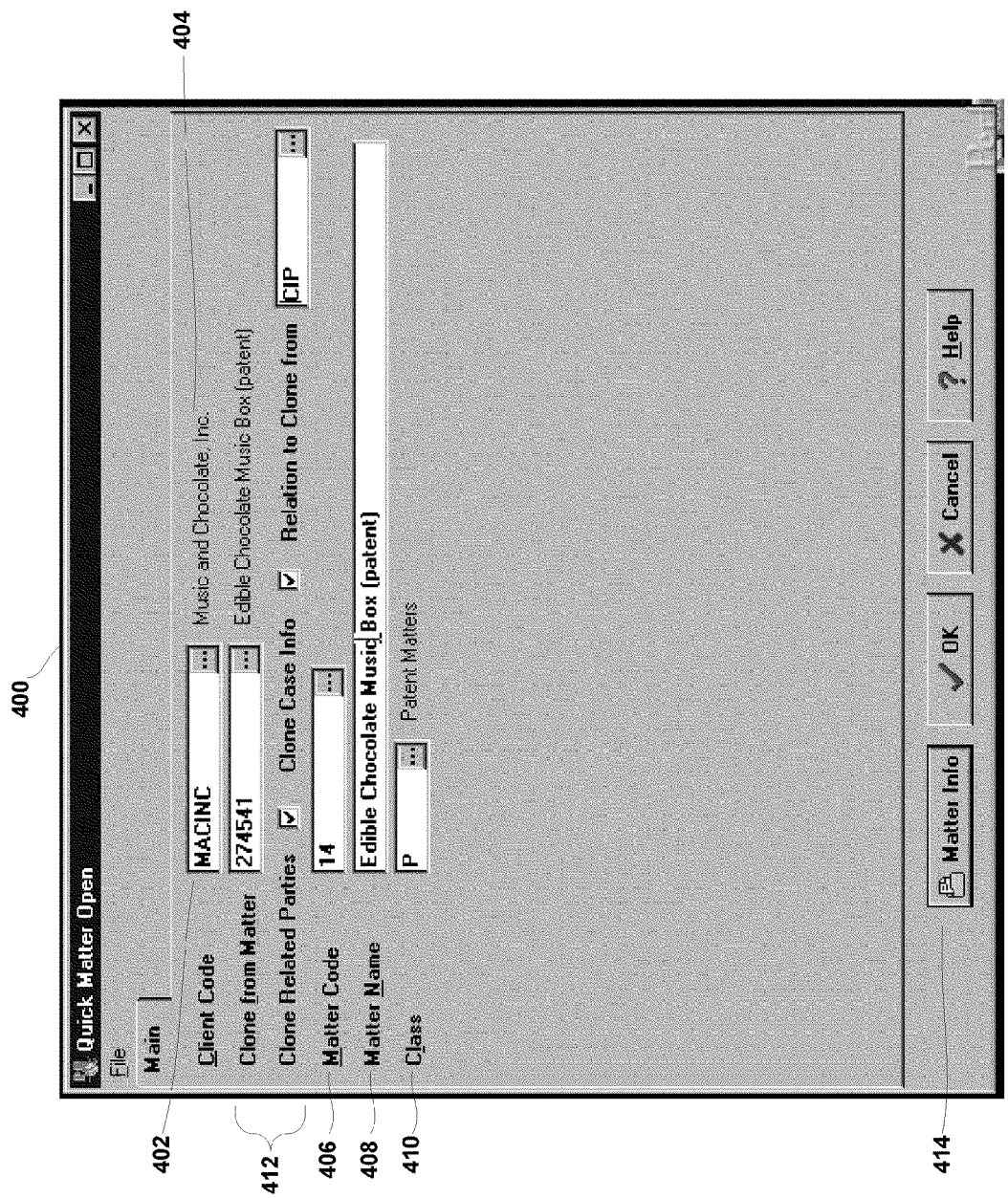
FIG. 4 is a screen shot of an exemplary interactive management display generated by the system shown in FIGS. 1 and 2.

If the matter profile is created manually, the matter profile may be created in an interactive management display via a user interface. A screen shot of an exemplary interactive management display 400 is shown in FIG. 4. The matter profile may include information about a client associated with the matter (e.g., a client code 402, a client name 404, contact information, communication preferences, and billing information). The matter profile further includes information on the particular matter such as a matter code 406, a matter name or title 408, a matter class 410 (e.g., patent matters), and the users or clients (e.g., attorneys) responsible for or otherwise associated with the particular matter.

Information for a matter profile may also be cloned from a similar or related matter. For example, the information may be cloned using clone selections 412. Information from a related matter of the same client or a matter of the same type (e.g., a continuation-in-part or CIP patent application) may be cloned into the present matter, either upon command or automatically by the system. A matter information selector 414 may contain more detailed information about the matter (e.g., manually entered or populated via information cloning).

The system may create workflow and automatically generate due dates, tasks, and reminders for the new or existing matter. As shown in FIG. 3, a step 303 of the flow chart includes automatically generating a matter timeline and matter tasks. The matter timeline and matter tasks may be generated or updated upon creation of a matter profile, upon receipt of a document, upon completion of a task, or upon command of a user or client 150.

Figure 5:
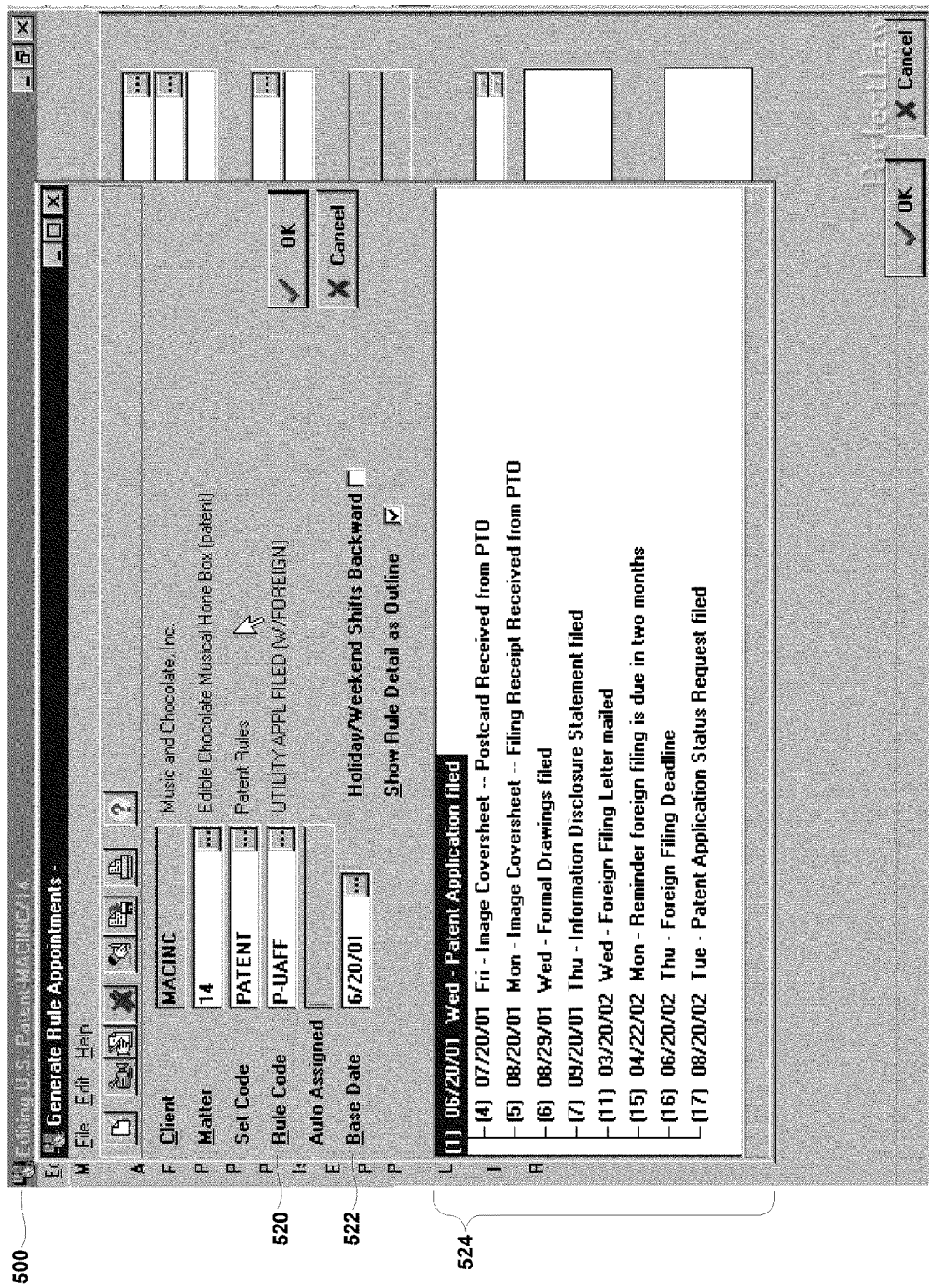
FIG. 5 is another screen shot of an exemplary interactive management display generated by the system shown in FIGS. 1 and 2.

A screen shot of another exemplary interactive management display 500 illustrating this is shown in FIG. 5. FIG. 5 illustrates one means of creating or generating tasks for a particular matter. In the present example, a rule code 520 may be associated with the matter either by a user or automatically by the system. The rule code 520 provides the system with information to generate the timeline and tasks for the particular transaction. For example, the rule code 520 may identify a set or subset of rules in the rules database 120. A base date 522 may also be designated from which to begin to the task and/or timeline (e.g., a patent filing date). The system then populates a timeline 524 with proposed tasks and proposed due dates. Each of the tasks may further be assigned to a particular user or client (e.g., attorney). The system may further alert (e.g., via email) the user or client of the due dates and/or remind the user as the due dates approach. A user or client may also verify and modify the timeline 524 if necessary. After verification by the user, the timeline 524 is saved in the transaction profile.

As shown in FIG. 3, a task document (e.g., 162) may be created for the transaction (step 305), either automatically or upon request by a user or client. For example, a task document 162 may be created to initiate or complete a particular task in the timeline 524. Discussed more below, completion of each task within the timeline 524 may then be updated manually or automatically by the system. For example, the system may update a task upon the creation and/or transmission of the task document or upon the receipt of a document.

Figure 6:
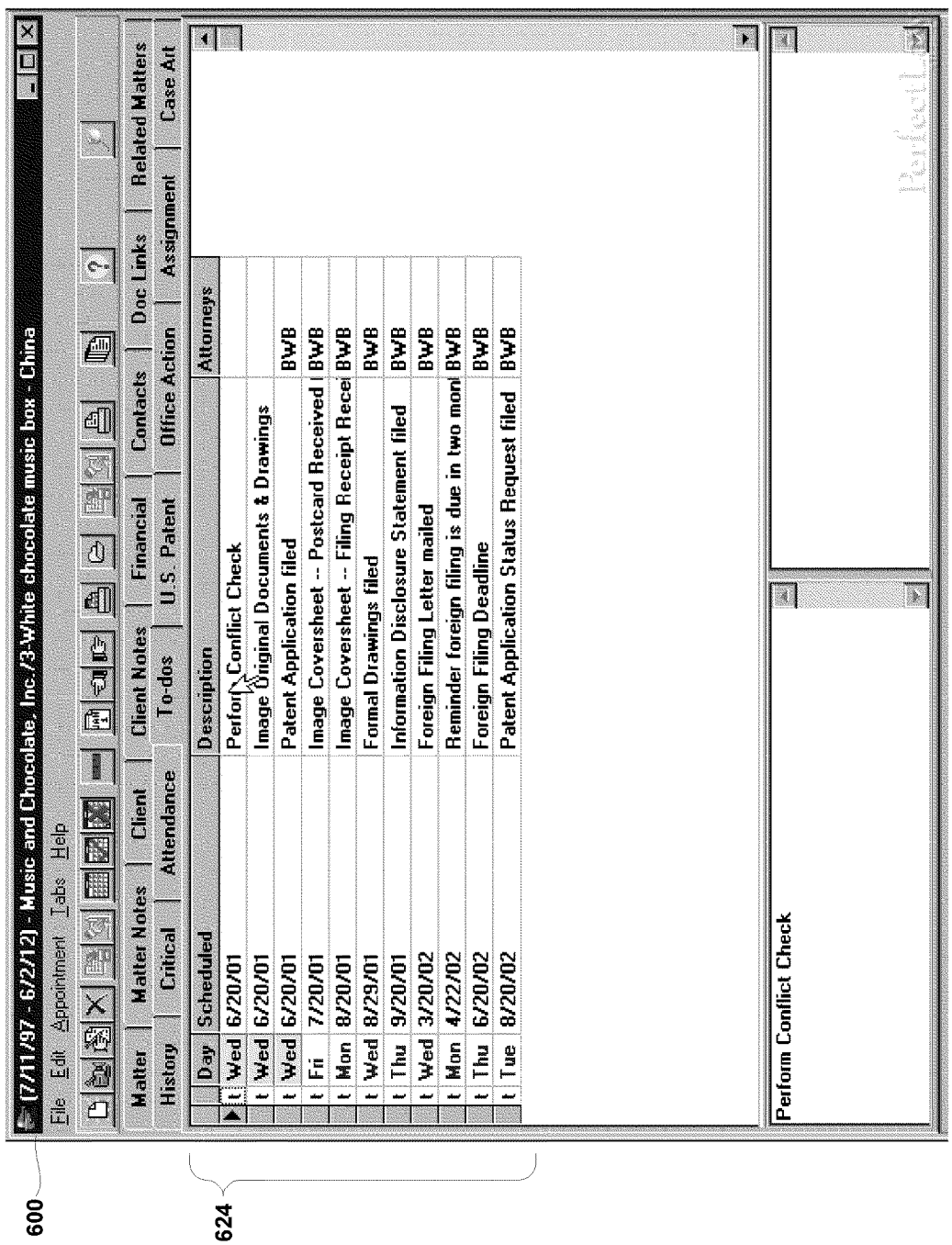
FIG. 6 is another screen shot of an exemplary interactive management display generated by the system shown in FIGS. 1 and 2.

FIG. 6 shows a screen shot of another exemplary interactive management display 600. The display 600 includes a timeline 624 (e.g., "To-dos"). In the present example, a task, such as "performing a conflict search," is implemented and completed. A task document, such as conflict report, is generated by the system. The conflict report may be generated automatically, e.g., at a predetermined time before the task's due date, or manually by selecting the task in the timeline 624. To generate the document, the system may retrieve the appropriate form 160, and populate the form with information from the matter profile, the database 140, and/or the rules database 120. The system may further prompt a user or client if additional information is required.

Shown in FIG. 3, the task document may be stored and/or routed by the system (step 307). For example, the task document may be profiled and stored in a corresponding matter profile or storage location (e.g., database 140) of the system and/or any other relational database associated with an identified matter or task. A reference and link to the task document is then generated in the interactive management displays for access to the task document by a client or clients 150.

The task document 162 may further be routed to a client or clients 150 as necessary. Again using a patent law practice as an example, a document such as a patent application may be automatically transmitted to the USPTO upon its completion and a client's approval. The document may be transmitted electronically via an electronic filing system 152 or sent via mail. The system may also automatically transmit the task document 162 to a printer in communication with the system.

The system may further notify particular users or clients (e.g., via email) of the task document 162, the storage or routing of the task document 162, generation of a task, completion of a task, or task that is due (step 307). The system may automatically notify all of a group of predetermined clients associated with the matter or task, or a group of manually selected recipients or clients from a matter contact list 730 (shown in FIG. 7). For example, each of the clients 150 identified in the conflict report or the users or clients 150 identified as being responsible for or associated with the particular matter or task may receive automatic notifications of activities associated with the matter or particular tasks therein.

The system may further notify and/or provide the task document 162 to a user (e.g., client) for approval or authorization. For example, the system may automatically transmit the task document 162 to a client 150 and await client authorization before completing the particular task or continuing to a further task. The system may automatically generate a corresponding letter or email requesting the authorization and transmit the request with the particular document to the client 150.

Shown in FIG. 3, the timeline and/or tasks may then be updated or new tasks may be determined or generated (step 311). The system may automatically recognize the completion of the task, e.g., when the document is saved and profiled and/or routed. For example, the system may update the timeline (e.g., 624) and tasks to indicate that authorization is pending upon the authorization request being transmitted to a client. A user may also manually indicate that the task (e.g., "performing a conflict search") has been completed (e.g., on the projected completion date).

Shown in FIG. 3, the system may also receive a document, e.g., from a client or any other source (step 313). For example, a paper document, such as a client document 164 or receipt report 154 (e.g., postcard) or any other document 104 (e.g., an office action) may be received. In some embodiments, the document will include one or more computer-readable identifiers (e.g., 106) identifying the document or associated matter and/or task. Therefore, the document may be immediately imaged via the imaging device 102 and processed. Upon imaging, a corresponding task or tasks may be generated or updated (e.g., marked complete).

Figure 8A:
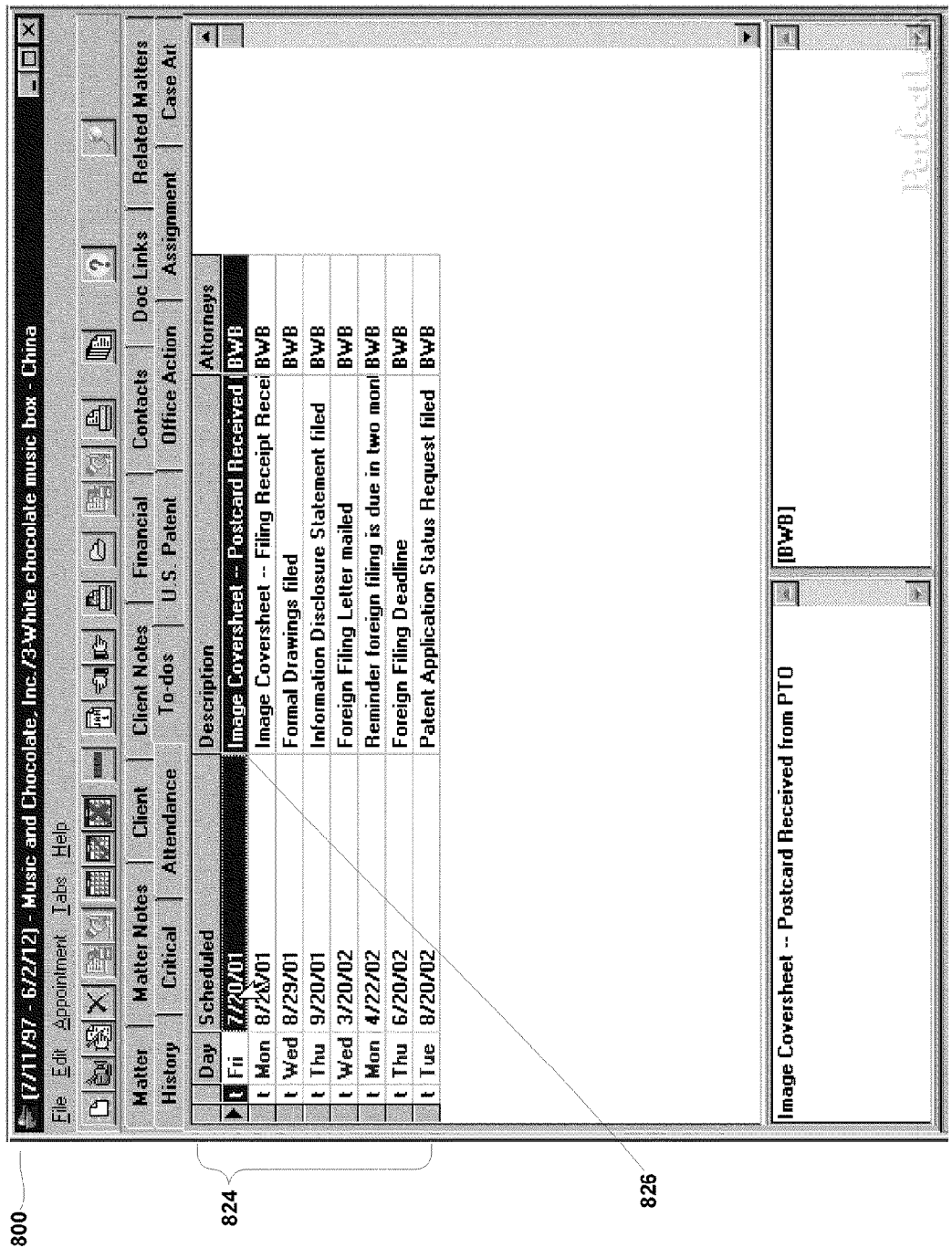
FIG. 8A is another screen shot of an exemplary interactive management display generated by the system shown in FIGS. 1 and 2.
Figure 8B:
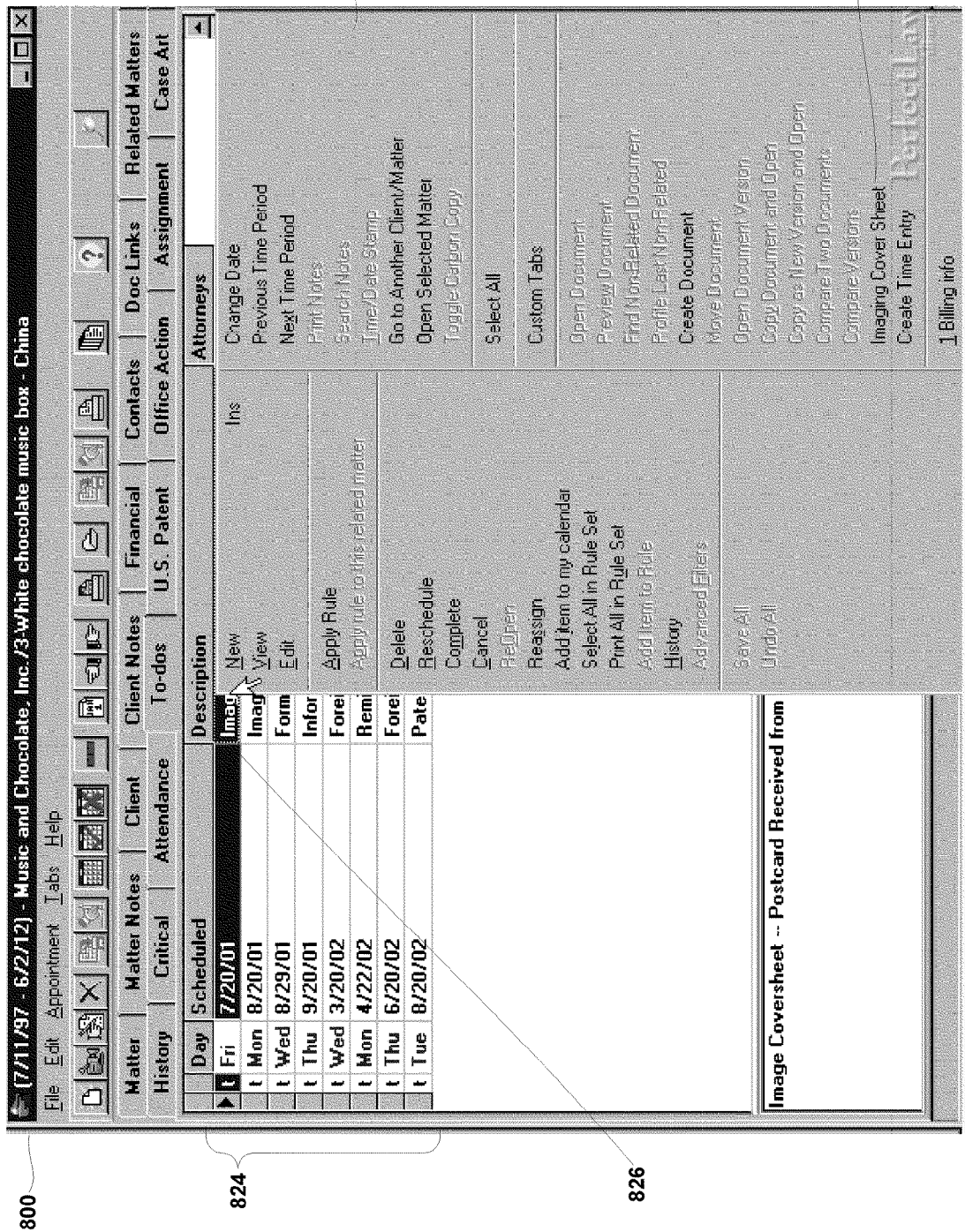
FIG. 8B is another screen shot of an exemplary interactive management display generated by the system shown in FIGS. 1 and 2.

If a computer-readable identifier 106 is not included on the document (e.g., 104/154/164), the document may be similarly imaged with a coversheet. For example, a display 800 shown in FIGS. 8A and 8B includes a timeline 824 including a task 826 of "postcard received." As shown, the task 826 has a projected completion date of Jul. 20, 2001. The user may select the task 826 to open an options window 840 (shown in FIG. 8B). An option 842 is selected to create an "imaging coversheet." The imaging coversheet will be generated automatically including information from the matter profile. Prior to or upon the generation of the imaging coversheet, a document key may be created for the postcard (e.g., automatically by the system or manually by a user or client).

Figure 9:
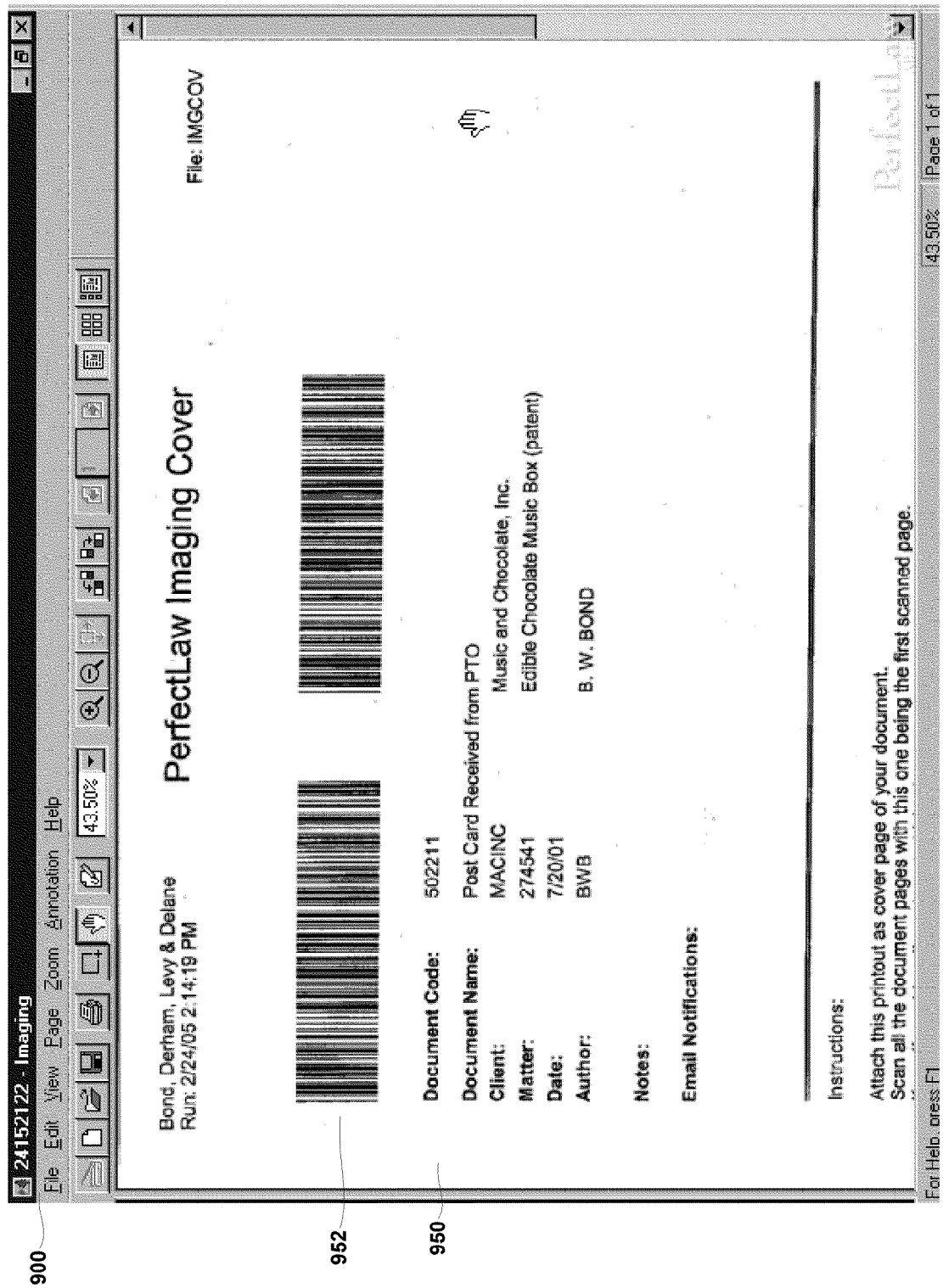
FIG. 9 is another screen shot of an exemplary interactive management display generated by the system shown in FIGS. 1 and 2.

A screen shot of another exemplary interactive management display 900 is shown in FIG. 9. The display 900 shows an exemplary imaging coversheet 950 generated for the postcard discussed above. The imaging coversheet 950 in the present example includes two computer-readable identifiers 952 (i.e., indices). Each identifier 952 may provide different information or the same redundant information. For example, if the identifiers 952 contain redundant information, the system may read both identifiers and compare the information contained therein to ensure the correct document profile, matter or task associated with the document is identified. One or both of the computer-readable identifiers 952 contains information for the system to determine the corresponding matter, task, storage location, and/or routing properties for the particular document. For example, the identifiers 952 may include a document key identifiable to an existing or newly created document profile or task. A computer-readable identifier 952 may contain additional information such as, e.g., information regarding the document type, author, applicable rules, time/date (e.g., of scanning or receipt), etc.

The coversheet 950 may also include additional text information regarding the document and corresponding matter or task. For example, the coversheet 950 may include text identifying, e.g., a document code, a document name, client, matter code, task code, and clients to notify. The coversheet 950 may further include information such as a security and privacy authorization (e.g., for access and routing). For example, the coversheet 950 may include information to restrict the distribution of a document (e.g., for internal distribution only). The coversheet 950 may further include document type or format information (e.g., PDF or Tiff), and additional notes, instructions, or memos related to the handling of the document.

A step 315 shown in FIG. 3 includes imaging the document and interpreting the identifier (e.g., 952). This may be achieved by imaging or scanning the document in combination with the coversheet (e.g., 950) via the imaging device 102. The imaging device 102 receives information from the computer-readable identifier(s) 952 on the coversheet and determines a matter profile, document profile and/or task associated with the document. The system may then access the matter profile and/or document profile (e.g., in the database 140) to obtain additional information regarding the document, matter and task.

As may be understood by those of ordinary skill in the art, the cover sheet 950 may be unnecessary if the computer-readable 952 is placed on the actual document. For example, in some embodiments each document related to a transaction or matter includes an embedded identifier on the first page of the document. In the case of a patent practice, the USPTO may include such identifiers on all patent correspondence with inventors and/or law firms. The identifiers may include information to identify the particular matter and the law firm responsible for the matter. The identifier may further indicate a USPTO customer number associated with the document.

In some embodiments, the system according to the present invention further includes error detection software. The error detection software provides a means by which to determine when a document is not properly identified or matched to a corresponding document profile, document key, matter profile or task. For example, the system may read an identifier 106 which does not match any new or existing (e.g., pending) document key, or two identifiers on the same document or coversheet that do not correspond. If such an error occurs, the system stores the imaged document in an error storage (e.g., in the database 140 and/or temporary memory). After one or more attempts to match, or a predetermined amount of time, the system may then generate a notification of the unmatched document or error. The notification is transmitted to a system administrator, client or any other recipient.

The error detection software may further determine when a document has not been imaged. For example, the system, or a client or user thereof, may create a document profile and document key for a particular document 104. After such creation, the system tracks the pending document key to determine if and when the document 104 is received that corresponds to the pending document key. If, after a predetermined amount of time, the pending document key has not been matched to an imaged document, the system generates a notification.

Figure 10:
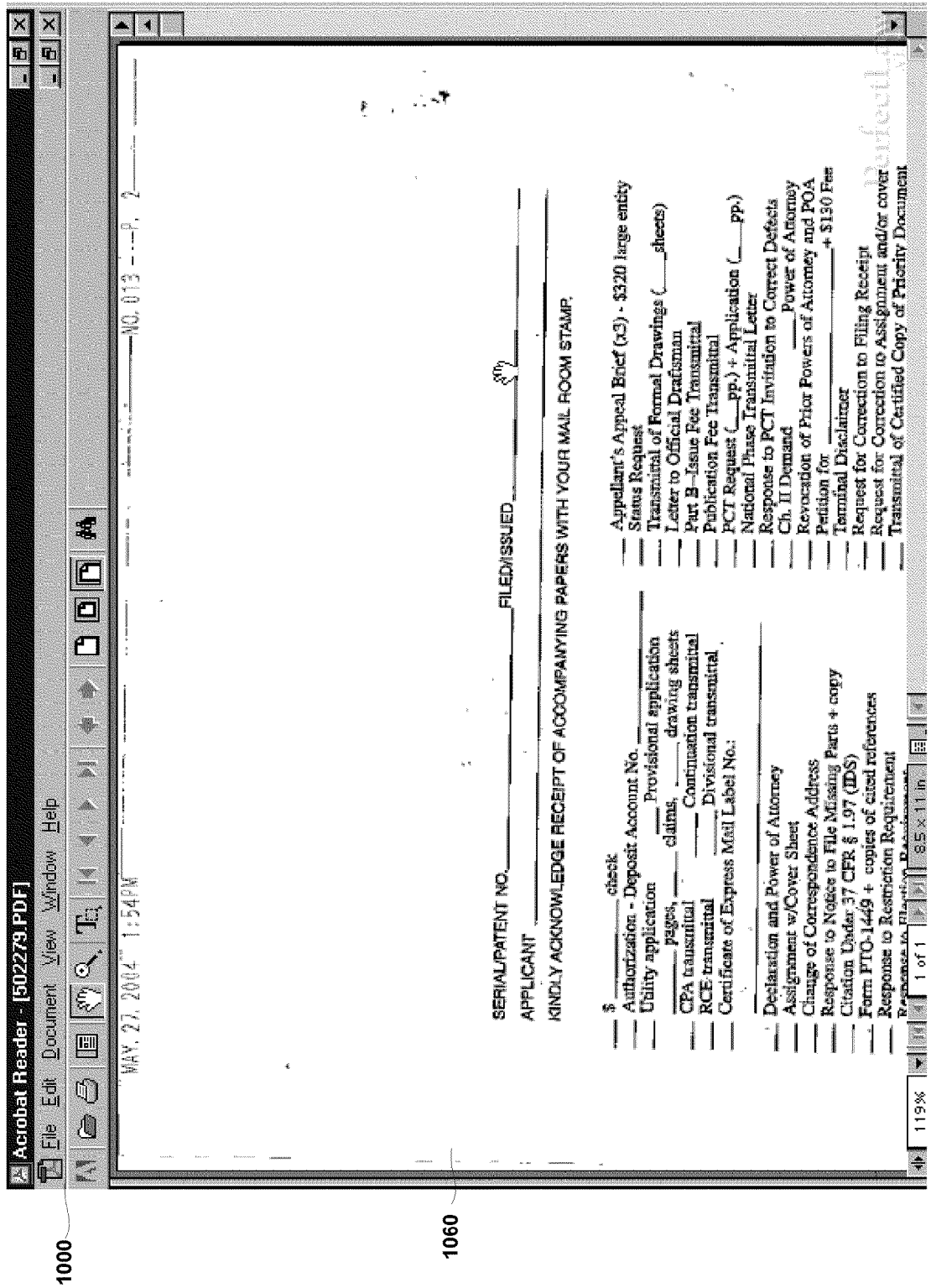
FIG. 10 is another screen shot of an exemplary interactive management display generated by the system shown in FIGS. 1 and 2.

After a document 104 has been imaged and the identifier or identifiers 106 interpreted, the document is then routed to a storage location associated with the identified document profile and/or matter (step 317). For example, the document may be profiled and stored in a corresponding file, storage location (e.g., 140), or sub storage location of the system. Upon the routing and/or storing of the document, a reference and link to the document is generated in the interactive management displays to allow access to the document by clients 150. A user or client 150 may retrieve (e.g., from the database 140) and/or view the document by accessing an interactive management display associated with the particular matter. As shown in FIG. 10, the user may view a document 1060 (e.g., postcard) via an interactive management display 1000.

Figure 7:
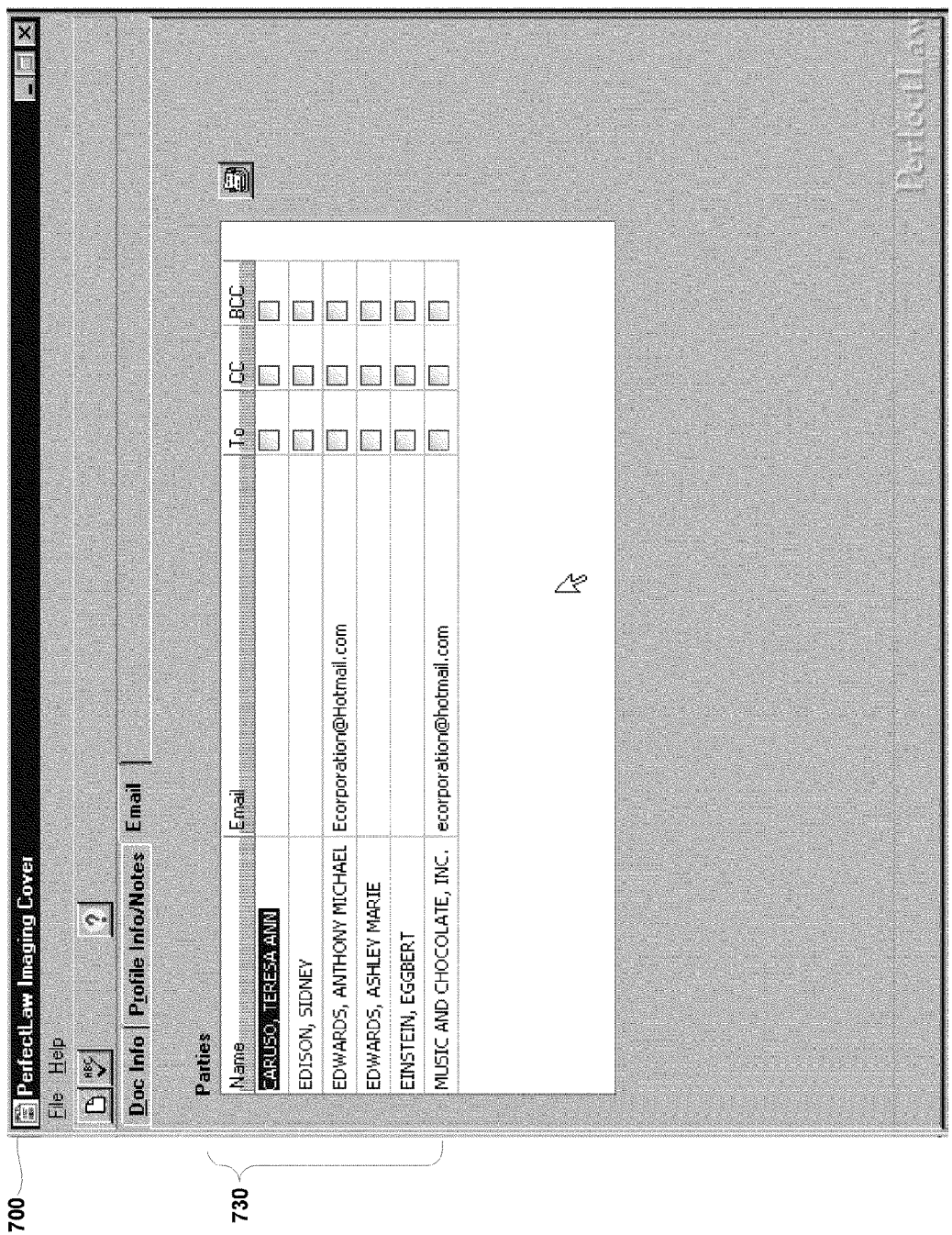
FIG. 7 is another screen shot of an exemplary interactive management display generated by the system shown in FIGS. 1 and 2.

As discussed above, FIG. 3 illustrates a further step 309 of notifying users and/or clients. The step 309 may occur automatically, e.g., as a consequence of the receipt and imaging of a document in a particular matter (step 313, 315) or as a consequence of creating and/or transmitting a task document (steps 305, 307). For example, a matter profile or particular document profile stored by the system may include notification preferences. The notification preferences may be a list of clients (e.g., attorneys, clients, customers, entities) to receive a copy of a document as shown in FIG. 7.

Figure 11:
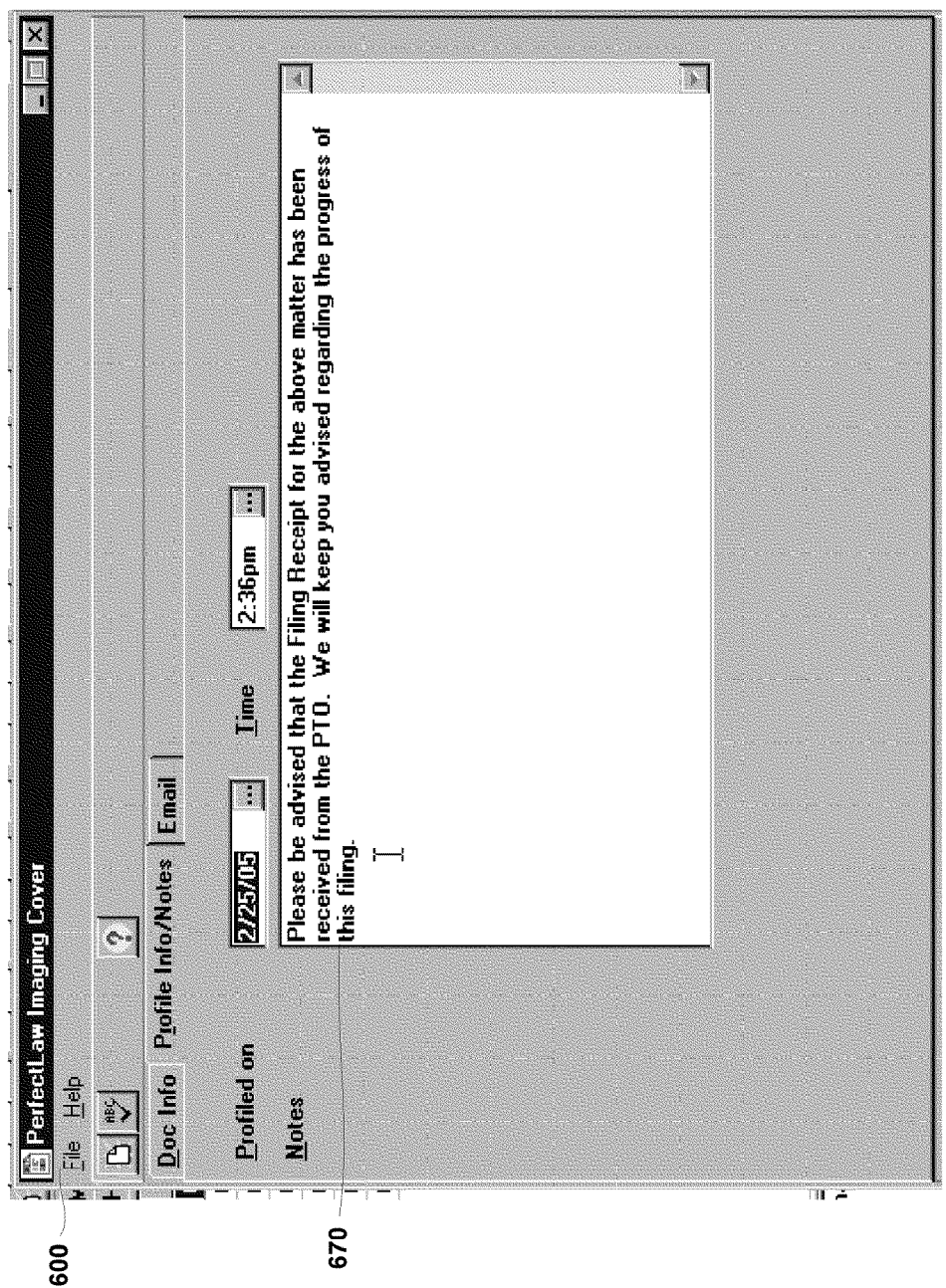
FIG. 11 is another screen shot of an exemplary interactive management display generated by the system shown in FIGS. 1 and 2.

The notification preferences may also include text to include in an email or letter automatically generated to a user concerning a document or task. FIG. 11 shows the display 700 including notes 770 providing text to transmit to a particular client 150. In the present example, the notes 770 indicate that an email or letter is to be automatically generated and sent to a particular recipient or group of recipients (shown in FIG. 7), with the included text, upon completion of the task or imaging of the document. The notification may further include the transmission of the document to the recipients.

In step 311 (shown in FIG. 3), the timeline is updated to reflect the completion of a particular task or the receipt/creation of a task document. For example, the system may adjust the workflow, due dates, and reminders for the transaction or matter based on the receipt or creation of the particular document. As discussed above, the updating of the timeline may occur at any time during the use of the system. The updating may be performed automatically by the system or manually by a user of the system.

Figure 12:
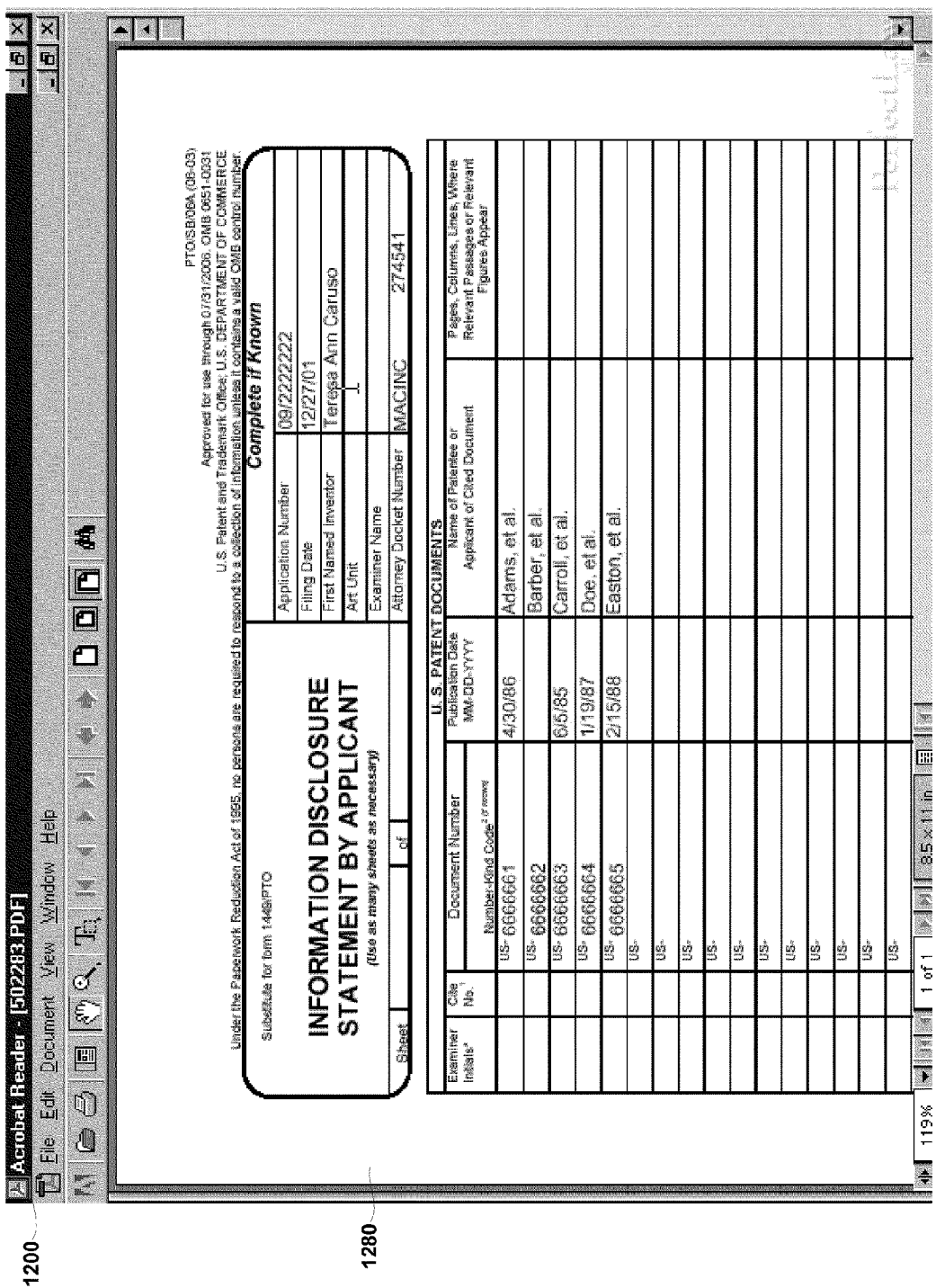
FIG. 12 is another screen shot of an exemplary interactive management display generated by the system shown in FIGS. 1 and 2.

Shown in FIG. 12, the system may further merge forms or generate documents specific to a particular area of practice. For example, the system may generate an Information Disclosure Statement ("IDS") 1280 as often necessary in a patent matter. The IDS 1280 may be generated automatically by the system to complete an upcoming task deadline, or manually by a user or client. The system may automatically populate the IDS using information from the matter profile or information received from a client 150. The system may then transmit the IDS to the USPTO (e.g., upon verification or approval).

In some embodiments of the system, a billing profile (not shown) may be automatically generated for each task completed in a particular matter. For example, in the context of a law firm, time to complete a task may be automatically recorded and billed to a corresponding client 150. The system may further maintain an audit log of all workflow in a particular matter.

The present invention as described herein may further provide means to simultaneously manage paper and/or hardcopy records if desired. As one of ordinary skill in the art will understand, the computer-readable identifiers 106 may also be used to track a hard copy of a particular imaged document, group of documents, or matter record. For example, upon the opening of a matter and/or document profile and imaging of a document, a record of the document with its one or more computer-readable identifiers, or coversheet including the identifier(s), may be maintained (e.g., for use or reference by a client or for archiving purposes). Using the computer-readable identifiers, the system may therefore provide for the management of the record and any other records in a particular office or record storage facility.

In one embodiment, readers, such as handheld reader devices, may be used to check-in/out a physical record at particular locations. The locations may also be identified with computer-readable identifiers (such as stick-on identifiers). The system may then create indications of the record's location and handling in a matter and/or document profile of the system. A user or client may therefore determine the precise physical location of the particular record within the office environment (e.g., in an individual's office, a filing cabinet, folder, or container) via an interactive management display of the present invention. The interactive management display may further provide the status of the record, such as the number of copies created and whether it has been archived, destroyed or returned.

Advantages of the present invention therefore include the provision of a comprehensive document and record management system enabling the simplified integration of paper documents into the digital workflow. Further advantages of the present invention include the provision of a system to automatically manage workflow. A further advantage of the present invention is the provision of additional security and privacy via the automation of document routing and storage.

Although the invention has been described with reference to a particular arrangement of parts, features and the like, these are not intended to exhaust all possible arrangements or features, and indeed many modifications and variations will be ascertainable to those of skill in the art.

What is claimed is:

1. A document imaging and management system, comprising:
   a device for imaging at least one coversheet and at least one document associated with the coversheet;
   a database including a plurality of rules for managing documents and tasks;
   at least one processor;
   software executing on said at least one processor for creating and storing a document profile unique to a particular document and creating a document key unique to the document before the document is imaged, wherein the document profile includes the document key unique to the document and routing instructions for the document, and wherein a coversheet of the document includes at least one computer readable identifier indicative of the document key;

software executing on said at least one processor for reading the computer-readable identifier from coversheet and matching the imaged document to the stored document profile based on the document key;

software executing on said at least one processor for routing the imaged document based on the stored document profile;

software executing on said at least one processor for determining at least one task associated with the document based on the stored document profile and at least one of the plurality of rules; and error detection software executing on said processor for monitoring imaged documents received by the system and pending document keys for which document profiles have been created to detect unmatched imaged documents and unmatched pending document keys, wherein said error detection software stores the imaged document in an error storage if the imaged document is received but not matched to the document key.

2. The system according to claim 1, wherein said software for routing stores the imaged document in a location corresponding to the document profile and sends the imaged document to one or more recipients identified in the routing instructions of the stored document profile.

3. The system according to claim 1, further comprising:
software executing on said processor for reporting the at least one task.

4. The system according to claim 1, further comprising:
software executing on the processor for initiating the at least one task.

5. The system according to claim 4, wherein said software for initiating the task generates at least one task document different from the imaged document.

6. The system according to claim 5, further comprising:
software executing on said processor for storing the at least one task document in a location based on the document profile.

7. The system according to claim 5, further comprising:
software executing on said processor for transmitting the at least one task document to an electronic filing system.

8. The system according to claim 5, further comprising:
software executing on said processor for transmitting the at least one task document to at least one client.

9. The system according to claim 4, further comprising:
a forms database comprising a plurality of forms,
wherein said software for initiating the task generates a task document, different from the imaged document, based on one of the plurality of forms which corresponds to the at least one task.

10. The system according to claim 1, wherein the rules include intellectual property rules.

11. The system according to claim 1, wherein the rules include rules of civil procedure.

12. The system according to claim 1, wherein the computer-readable identifier is printed on the coversheet of the document and is used to match the document to the stored document profile.

13. The system according to claim 1,
wherein the document or the coversheet includes two or more substantially identical computer-readable identifiers,
wherein said software for reading the computer-readable identifier reads each of the two or more substantially identical identifiers and compares each of the two or more substantially identical identifiers.

14. The system according to claim 1, further comprising:
software executing on said at least one processor for determining a saved location of the document based on the previously stored document profile as identified by the computer-readable identifier.

15. A method for imaging and managing documents, comprising the steps of:
creating a document profile associated with a document before the document is imaged, the document profile unique to the document and including at least a document key unique to the document;
storing the document profile and the document key unique to the document before the document is imaged;
printing a coversheet including a computer-readable identifier thereon before the document is imaged, wherein the at least one computer readable identifier is indicative of the document key;
imaging the document and the printed coversheet, wherein the coversheet includes the at least one computer-readable identifier thereon;
interpreting the identifier from the coversheet to match the document to the stored document profile based on the document key;
monitoring imaged documents received by the system and pending document keys for which document profiles have been created to detect unmatched imaged documents and unmatched pending document keys, wherein the document is routed to an error storage if the imaged document is received but not matched to the document key.

16. The method according to claim 15, further comprising the step of:
storing the document in a location corresponding to the document profile.

17. The method according to claim 15, further comprising the steps of:
determining at least one task associated with the document based on the stored document profile and at least one rule.

18. The method according to claim 17, further comprising the step of:
reporting the at least one task as complete.

19. The method according to claim 17, further comprising the steps of:
generating a task document, different from the imaged document, according to the at least one task; and
storing the task document in a location defined by a document profile unique to the task document.

20. A method for imaging and managing documents, comprising the steps of:
generating a matter profile;
generating one or more tasks for the matter profile based on at least one rule;
generating a document profile unique to a particular document and associated with the matter profile, the document profile including a document key unique to the document and routing instructions for the document;
storing the document profile;
generating a coversheet with at least one computer-readable identifier indicative of the document profile on the coversheet;
receiving and imaging the document and the coversheet including the computer-readable identifier;

reading and interpreting the identifier to match the document to the stored document profile unique to the document based on the document key;

identifying at least one of the one or more tasks associated with the document based on the stored document profile; and routing the document based on the stored document profile; and monitoring imaged documents received by the system and pending document keys for which document profiles have been created to detect unmatched imaged documents and unmatched pending document keys, wherein the document is routed to an error storage if the imaged document is received but not matched to the document key.

21. A document imaging and management system, comprising:

at least one processor;

a database including a plurality of document profiles, each document profile unique to one document and including a document key unique to the one document and routing instructions for the one document;

software executing on said at least one processor for creating a document profile including a document key for a document before the document is imaged and storing the document profile in the database;

software executing on said at least one processor for generating a coversheet including at least one computer-readable indicia on the coversheet indicative of the document key;

a device for imaging the coversheet together with the document;

software executing on said at least one processor for reading the computer-readable indicia on the coversheet and matching the document to the stored document profile unique to the document based on the document key;

software executing on said at least one processor for routing the imaged document based on the stored document profile; and error detection software executing on said processor for monitoring imaged documents received by the system and pending document keys for which document profiles have been created to detect unmatched imaged documents and unmatched pending document keys, wherein said error detection software stores the imaged document in an error storage if the imaged document is received but not matched to the document key.

22. The system according to claim 21, wherein the database further includes a plurality of rules for managing documents and tasks; and wherein the system further comprises software executing on said processor for determining at least one task associated with the document based on the document profile and at least one of the plurality of rules.

23. The system according to claim 21, wherein the computer-readable indicia includes a barcode.

24. The system according to claim 21, wherein at least one of the document and the coversheet includes two or more substantially identical computer-readable indicia, wherein said software for reading the computer-readable indicia reads each of the two or more substantially identical indicia and compares each of the two or more substantially identical indicia.

25. The method according to claim 15, wherein the step of interpreting the identifier includes comparing the document key to a group of pending document keys.

26. The method according to claim 15, further comprising the steps of:

routing the document to one or more clients based on the stored document profile.

27. The method according to claim 17, further comprising the step of:

reporting the at least one task to one or more clients.

28. The system according to claim 1, wherein said error detection software tracks each of unmatched pending document keys and generates a notification if an unmatched pending document key is not matched to an imaged document within a predetermined amount of time.

29. The system according to claim 21, wherein said error detection software tracks each of unmatched pending document keys and generates a notification if an unmatched pending document key is not matched to an imaged document within a predetermined amount of time.

* * * * *